United States Patent
Ramsperger et al.

(10) Patent No.: US 11,248,909 B2
(45) Date of Patent: Feb. 15, 2022

(54) ROTATION-RATE SENSOR, METHOD FOR MANUFACTURING A ROTATION-RATE SENSOR

(71) Applicant: Robert Bosch GmbH, Stuttgart (DE)

(72) Inventors: Robert Ramsperger, Gaeufelden (DE); Martin Putnik, Rottenburg am Neckar (DE); Stefano Cardanobile, Reutlingen (DE)

(73) Assignee: Robert Bosch GmbH, Stuttgart (DE)

( * ) Notice: Subject to any disclaimer, the term of this patent is extended or adjusted under 35 U.S.C. 154(b) by 145 days.

(21) Appl. No.: 16/635,777

(22) PCT Filed: Jul. 12, 2018

(86) PCT No.: PCT/EP2018/068940
§ 371 (c)(1),
(2) Date: Jan. 31, 2020

(87) PCT Pub. No.: WO2019/029944
PCT Pub. Date: Feb. 14, 2019

(65) Prior Publication Data
US 2020/0386550 A1    Dec. 10, 2020

(30) Foreign Application Priority Data
Aug. 7, 2017    (DE) .......................... 102017213640.5

(51) Int. Cl.
*G01C 19/5719*    (2012.01)
(52) U.S. Cl.
CPC ................. *G01C 19/5719* (2013.01)
(58) Field of Classification Search
CPC .............. G01C 19/571; G01C 19/5733; G01C 19/5783
See application file for complete search history.

(56) References Cited

U.S. PATENT DOCUMENTS

| | | |
|---|---|---|
| 5,945,599 A | 8/1999 | Fujiyoshi et al. |
| 2007/0214890 A1* | 9/2007 | Mukherjee .......... G01C 19/5719 73/514.29 |
| 2011/0138912 A1 | 6/2011 | Degawa et al. |

FOREIGN PATENT DOCUMENTS

| | | |
|---|---|---|
| DE | 102013208699 A1 | 11/2014 |
| DE | 102013223825 A1 | 5/2015 |
| DE | 102015213447 A1 | 1/2017 |

OTHER PUBLICATIONS

International Search Report for PCT/EP2018/068940, dated Oct. 9, 2018.

* cited by examiner

*Primary Examiner* — Peter J Macchiarolo
*Assistant Examiner* — John M Royston
(74) *Attorney, Agent, or Firm* — Norton Rose Fulbright US LLP; Gerard Messina

(57) ABSTRACT

A rotation-rate sensor having a substrate, the rotation-rate sensor having a drive structure that is movable in relation to the substrate, the drive structure being attached to the substrate by a spring system, the spring system having a first spring component that connects the drive structure and the substrate, and a second spring component that connects the drive structure and the substrate, the first spring component and the second spring component being connected by an intermediate piece, wherein the intermediate piece includes a first edge bar and a second edge bar, a group of connecting bars being configured between the first and second edge bar, the connecting bars of the group of connecting bars each being disposed at an opening angle of between 1° and 89° on the first and/or second edge bar.

15 Claims, 1 Drawing Sheet

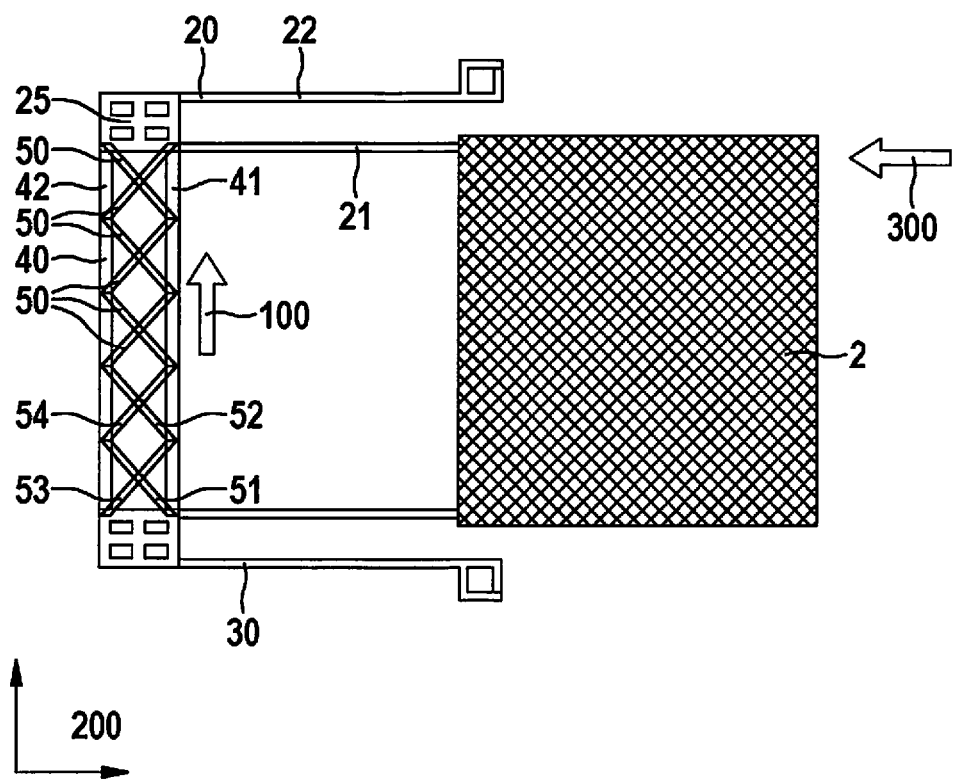

ROTATION-RATE SENSOR, METHOD FOR MANUFACTURING A ROTATION-RATE SENSOR

FIELD OF THE INVENTION

The present invention relates to a rotation-rate sensor.

BACKGROUND INFORMATION

Rotation-rate sensors on substrates are generally known. Such rotation-rate sensors are special microelectromechanical systems (MEMS), which can be used to measure rotation rates. Sensors of this kind are used in a variety of applications. Typically, rotation-rate sensors thereby have one or a plurality of drive structures. The drive structures can usually be driven by electrodes, for example, by comb electrodes. For this, the spring structures/spring systems resiliently connect the drive structures (respectively, drive frames) of the rotation-rate sensor to the substrate. Here, spring structures, which are constructed from folded bars, are sometimes used. At the same stiffness, such spring structures tend to have a lower tensile stress than simple bars. Spring structures of this kind are referred to as U-shaped springs. A special configuration of spring systems is constituted of two connected U-shaped springs that are connected by a broad spring end (flying bar). Such spring systems are also referred to as "double-folded beam suspensions" (DFBS).

However, the disadvantage of such known spring systems, especially of known DFBS, is that they, in part, deviate substantially from a desired linear restoring force, which has a detrimental effect on the behavior of the rotation-rate sensors.

SUMMARY OF THE INVENTION

It is an object of the present invention to provide a rotation-rate sensor having a drive structure, which is attached by a spring system to a substrate, that, in comparison to known related-art rotation-rate sensors, will have an improved sensor behavior.

In accordance with the main description herein, the rotation-rate sensor according to the present invention has the advantage over related-art sensors of making possible a high stability of the spring system at a reduced mass by configuring a group of connecting bars between the first and second edge bars. As a result, only minor inertia forces act on the spring system during oscillation, which has a beneficial effect on a reduction of non-linearities of the drive oscillation. In particular, the present invention makes it possible to reduce the weight of the intermediate piece and thus of the entire spring system. The configuration of the connecting bars between the first and second edge bars of the intermediate piece, each time with an opening angle of between 1° and 89° between one of the connecting bars and the first and/or second edge bar has a beneficial effect on reducing the weight of the spring system and, at the same time, has a positive effect on the mechanical properties. This makes it possible, for example, to realize a high stability and, at the same time, large recesses within the intermediate piece. Reducing the non-linearity of the drive oscillation has the further advantage of decreasing the excitability of parasitic modes, which occur locally on the spring structure/spring system, and of decreasing the feedback of the drive oscillation to these parasitic modes.

Along the lines of the present invention, in fact, the opening angle relates to the smaller angle in each instance, which is present between the first or second edge bar and a connecting bar at the meeting point of the first or second edge bar and the connecting bar (in the plane defined by the main axis of extent of the edge bar and the main axis of extent of the connecting bar). Thus, at most, the opening angle may be 90° and, to be more precise, in the case that the edge bar and the connecting bar are mutually orthogonally disposed.

Generally, during operation of the rotation-rate sensor in the case of small deflections of the spring structure/spring system, the intermediate piece (in particular the "flying bar") is entrained and follows the movable mass of the rotation-rate sensor in phase. In the case of larger deflections, inertia forces increasingly act on the intermediate piece, the reversal points of the oscillation of the moving mass and the oscillation of the intermediate piece drifting out of phase. As a result, the bars (thus, in particular, the first and second spring component) of the spring structure/spring system are more heavily stressed. This leads to a dynamic non-linearity of the drive structure. In accordance with the present invention, reducing the mass of the intermediate piece makes it advantageously possible to obtain the inertia forces acting on the intermediate piece, particularly in the dynamic case, making it possible for the spring system to advantageously have a lower dynamic non-linearity.

Advantageous embodiments and refinements of the present invention may be derived from the further descriptions herein, as well as from the description, with reference to the drawing.

Because a specific embodiment of the present invention provides for the connecting bars of the group of connecting bars to be configured on the first and/or second edge bar in each case with an opening angle of between 10° and 80°, which may be between 30° and 60°, especially of between 40° and 50°, most particularly may be between 44° and 46°, it is very advantageously possible to lessen the weight of the intermediate piece (thus, for example, of the spring end) and very advantageously reduce the inertia forces acting on the spring system during oscillation. At the same time, especially advantageous mechanical properties may be achieved, for example, a desired stability may be achieved.

Because a specific embodiment of the present invention provides for the connecting bars of a first subgroup of the group of connecting bars to feature a positive gradient relative to a main axis of extent of the first edge bar, the connecting bars of a second subgroup of the group of connecting bars featuring a negative gradient relative to the main axis of extent of the first edge bar, in particular, the first subgroup and the second subgroup essentially having the same number of connecting bars, a particularly advantageous weight reduction is possible at the same time as advantageous mechanical properties.

Because a specific embodiment of the present invention provides for one of the connecting bars of the first subgroup to intersect at least one of the connecting bars of the second subgroup in each particular case, a special mechanical stability of the intermediate piece may be attainable in the face of force influences from diverse directions.

Because a specific embodiment of the present invention provides for free spaces to be formed between the connecting bars, the free spaces having a rhombic base surface, in particular projected onto a main plane of extent of the substrate, the weight of the intermediate piece (due to these free spaces or recesses) may be quite advantageously reduced. In particular, it is possible that the main axis of extent of the substrate is disposed parallel to a plane spanned by the main axes of extent of the connecting bars and the main axes of extent of the edge bars.

Because a specific embodiment of the present invention provides for the rotation-rate sensor to have a further spring system, which may be two spring systems, more particularly may be three further spring systems, the further spring system, the further spring systems may be configured to be essentially identical to the spring system, it is possible for the rotation-rate sensor to have a plurality of spring systems according to the present invention, which are configured, for example, on different sides of the rotation-rate sensor, and which especially may all have essentially the same configuration (except for a possible relative rotation of the respective further spring system in comparison to the spring system).

In accordance with specific embodiments of the present invention, it is possible for further connecting elements to be configured between the first and second edge bars, in addition to the group of connecting bars. It may be a question of further connecting bars, for example, which meet the first and/or second edge bar at any angle. It is alternatively or additionally possible for further connecting bars to be configured between the first and second edge bar that extend parallel to at least one of the edge bars. Furthermore, it is additionally or alternatively possible for further connecting elements in the form of surfaces or other geometric shapes to be disposed between the first and second edge bars.

In accordance with the present invention, it is possible that the group of connecting bars include exactly or more than two, three, four, five, ten, twenty or a multiplicity of connecting bars.

The method according to the invention for manufacturing a rotation-rate sensor according to a specific embodiment of the present invention has advantages over the related art already described in connection with the rotation-rate sensor according to the present invention or in connection with a specific embodiment of the rotation-rate sensor according to the present invention.

Exemplary embodiments of the present invention are illustrated in the drawing and explained in greater detail in the following description.

In the various figures, the same parts are always denoted by the same reference numerals and are, therefore, also typically only named or mentioned once.

BRIEF DESCRIPTION OF THE DRAWING

FIG. 1 schematically shows a plan view of a cut-away portion of a rotation-rate sensor in accordance with a specific embodiment of the present invention.

DETAILED DESCRIPTION

FIG. 1 schematically shows a plan view of a cut-away portion of a rotation-rate sensor in accordance with a specific embodiment of the present invention. The rotation-rate sensor includes a spring system 10, which connects a drive structure 2 to a substrate essentially disposed below illustrated spring system 10. The substrate is not explicitly shown. Spring system 10 includes a first spring component 20, a second spring component 30 and an intermediate piece 40, which forms a mechanical connection between first and second spring component 20, 30. First spring component 20 includes a first portion 21 formed as a bar and a second portion 22 formed as a bar, first and second portion 21, 22 being joined by a middle portion 25. Second spring component 30 is configured mirror-symmetrically to first spring component 20. The plane of symmetry thereby lies in the middle between first and second spring component 20, 30 and extends in the main direction of extent 300 of first portion 21 (illustrated by arrow 300) and in a direction orthogonal to the substrate (respectively, the top surface thereof). Intermediate piece 40 includes a first edge bar 41 and a second edge bar 42. First edge bar 41 and second edge bar 42 are disposed mutually in parallel, so that a first main axis of extent 100 of first edge bar 41 points in the same direction as a second main axis of extent of second edge bar 42. A group 50 of connecting bars is configured between first and second edge bar 41, 42. The group of connecting bars is divisible into a first subgroup of connecting bars and a second subgroup of connecting bars. Connecting bars 51, 52 of the first subgroup of connecting bars feature a positive gradient relative to main axis of extent 100 (indicated by arrow 100) of first edge bar 41. Connecting bars 53, 54 of second subgroup of connecting bars feature a negative gradient relative to main axis of extent 100 of first edge bar 41. In the present case, the first subgroup and the second subgroup each have the same number of connecting bars. However, they may also have a different number of connecting bars. All of the illustrated connecting bars 51, 52, 53, 54 of group 50 of connecting bars (thus, of both subgroups) meet first and second edge bars 41, 42 in each case at an opening angle of approximately 45°. An exemplary opening angle 60 at connecting bar 51 is marked in FIG. 1 for illustration purposes. In the illustrated specific embodiment, one of connecting bars 51, 52 of the first subgroup and one of connecting bars 53, 54 of the second subgroup intersect in the intermediate space/intermediate area between first and second edge bars 41, 42.

The intersecting connecting bars, for example, connecting bars 51, 53 may merge into one another in each case in the intersection region thereof, so that the total thickness thereof in the intersection region corresponds approximately to the thickness of one of relevant connecting bars 51, 53.

In accordance with the present invention, it is possible, as shown in FIG. 1, that intermediate piece 40 is disposed mirror-symmetrically to the plane of symmetry (which lies in the middle between first and second spring component 20, 30 and extends in main direction of extent 300 of first portion 21 and in a direction orthogonal to the substrate, respectively the top surface thereof). It is thereby possible that, on the whole, spring system 10 (as shown in FIG. 1) is essentially mirror-symmetric to this plane of symmetry.

In the specific embodiment shown in FIG. 1 (in particular, having a latticework structure), it is advantageously possible, for example, to reduce the mass of intermediate piece 40 of spring system 10 by 30% relative to a DFBS having a perforated intermediate piece. Simulation results indicate that the non-linearity of the drive oscillation may be thereby reduced by 11%.

What is claimed is:

1. A rotation-rate sensor, comprising:
   a substrate; and
   a drive structure that is movable in relation to the substrate, the drive structure being attached by a spring system to the substrate, the spring system having a first spring component that connects the drive structure and the substrate, and a second spring component that connects the drive structure and the substrate, the first spring component and the second spring component being connected via an intermediate piece;
   wherein the intermediate piece includes a first edge bar and a second edge bar, a group of connecting bars being configured between the first and second edge bar, the connecting bars of the group of connecting bars each being disposed at an opening angle of between 1° and 89° on the first and/or second edge bar.

2. The rotation-rate sensor of claim 1, wherein the connecting bars of the group of connecting bars is disposed in each case with an opening angle of between 10° and 80°, on the first and/or second edge bar.

3. The rotation-rate sensor of claim 1, wherein the connecting bars of a first subgroup of the group of connecting bars features a positive gradient relative to a main axis of extent of the first edge bar, and the connecting bars of a second subgroup of the group of connecting bars features a negative gradient relative to the main axis of extent of the first edge bar, wherein the first subgroup and the second subgroup have the same number of connecting bars.

4. The rotation-rate sensor of claim 3, wherein one of the connecting bars of the first subgroup intersects at least one of the connecting bars of the second subgroup.

5. The rotation-rate sensor of claim 1, wherein free spaces are formed between the connecting bars, the free spaces having a rhombic base surface which is projected onto a main plane of extent of the substrate.

6. The rotation-rate sensor of claim 1, wherein the connecting bars of the group of connecting bars mechanically intersect the first and second edge bars.

7. The rotation-rate sensor of claim 1, wherein the first and second edge bar are disposed mutually in parallel.

8. The rotation-rate sensor of claim 1, wherein the connecting bars of the group of connecting bars are disposed as struts between the first and second edge bar.

9. The rotation-rate sensor of claim 1, wherein the first spring component has a first portion and a second portion, wherein with the first portion, the drive structure is connected to the intermediate piece and, with the second portion, the intermediate piece or a middle portion disposed at least partially between the first portion and the second portion of the first spring component is connected to the substrate, the second spring component being configured mirror-symmetrically to the first spring component.

10. The rotation-rate sensor of claim 9, wherein the first portion and the second portion are formed as bars in each case, the first portion and the second portion being configured in parallel in the neutral position of the rotation-rate sensor.

11. The rotation-rate sensor of claim 1, further comprising:
at least one further spring system, wherein the at least one further spring system is identical to the spring system.

12. A method for manufacturing a rotation-rate sensor, the method comprising:
providing a substrate; and
providing a drive structure that is movable in relation to the substrate, the drive structure being attached by a spring system to the substrate, the spring system having a first spring component that connects the drive structure and the substrate, and a second spring component that connects the drive structure and the substrate, the first spring component and the second spring component being connected via an intermediate piece;
wherein the intermediate piece includes a first edge bar and a second edge bar, a group of connecting bars being configured between the first and second edge bar, the connecting bars of the group of connecting bars each being disposed at an opening angle of between 1° and 89° on the first and/or second edge bar.

13. The rotation-rate sensor of claim 1, wherein the connecting bar of the group of connecting bars is disposed in each case with an opening angle of between 30° and 60°, on the first and/or second edge bar.

14. The rotation-rate sensor of claim 1, wherein the connecting bar of the group of connecting bars is disposed in each case with an opening angle of between 40° and 50°, on the first and/or second edge bar.

15. The rotation-rate sensor of claim 1, wherein the connecting bar of the group of connecting bars is disposed in each case with an opening angle of between 44° and 46°, on the first and/or second edge bar.

* * * * *